July 11, 1967      G. A. STEPHEN      3,330,266
BARBECUE VESSEL
Filed Feb. 3, 1966
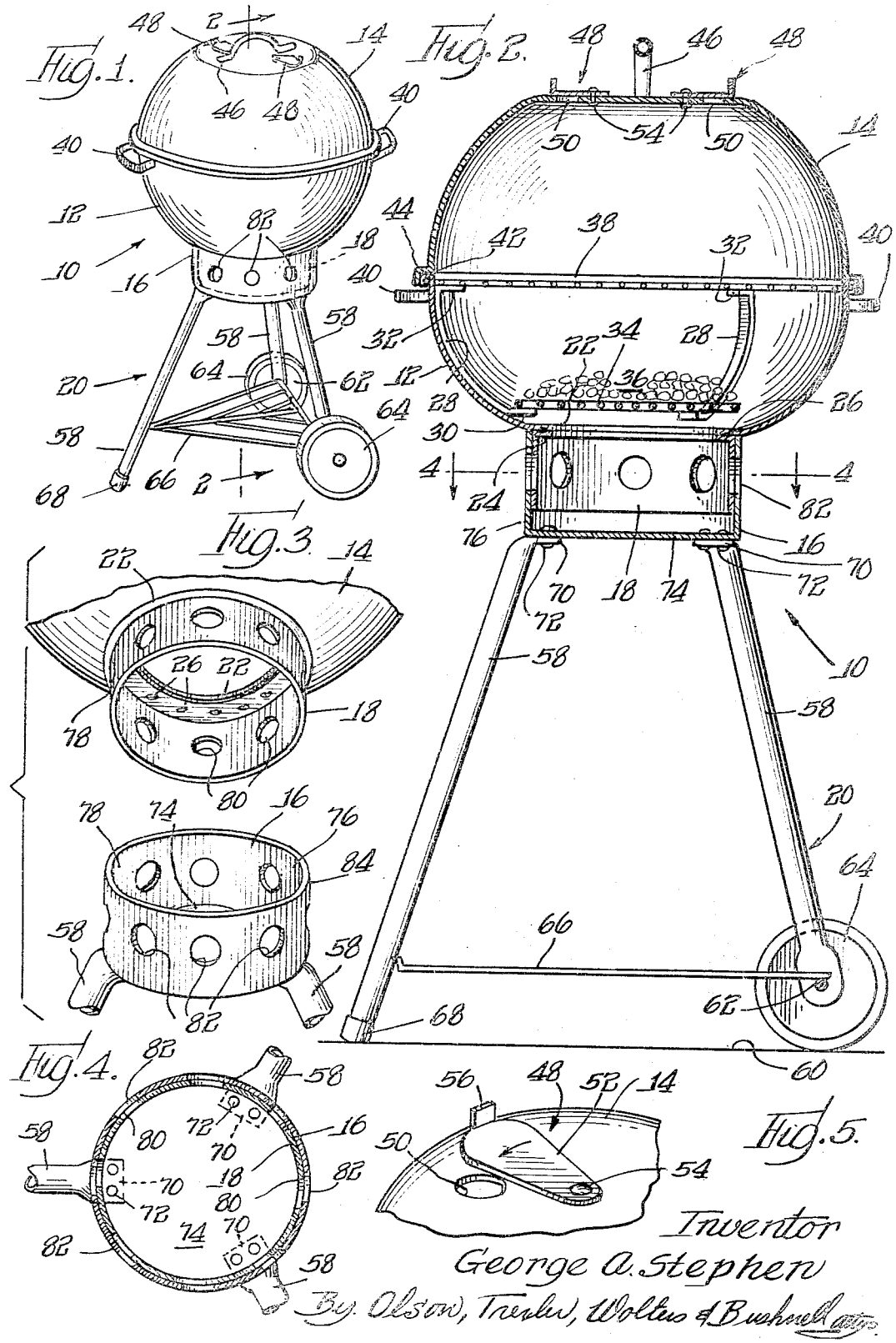
Inventor
George A. Stephen
By Olson, Trexler, Wolters & Bushnell attys United States Patent Office 3,330,266
Patented July 11, 1967

3,330,266
BARBECUE VESSEL
George A. Stephen, Prospect, Ill., assignor to Stephen Official Athletic Supplies, Inc., Arlington Heights, Ill., a corporation of Illinois
Filed Feb 3, 1966, Ser. No. 524,751
4 Claims. (Cl. 126—25)

ABSTRACT OF THE DISCLOSURE

A home barbecue that is arranged for comfortable damper adjustment by means of a laterally ported, circular skirt depending from the vessel proper to interfit with the upright, circular, laterally ported wall of an ash well, remote handle means being secured to the vessel for use in regulating the registration of the respective ports.

This invention relates generally to barbecue vessels and more particularly to damper-controlled barbecue vessels.

In one particularly advantageous type of barbecue vessel dampers are employed to control the rate and uniformity of fuel burning and therefore the rate and uniformity of heat evolution. Operation of such dampers correspondingly regulates the cooking speed of at least the surface tissues of the food item or items being prepared. It has been common practice heretofore to provide a barbecue vessel with spaced ports and to arrange a manually adjustable valve element with each such port for creating a damper effect. When one or more of these ports is disposed in an appropriate position beneath the fuel tray, each such port may also be used to evacuate ashes into an underlying receptacle for disposal, with or without preliminary cooling. This prior art construction necessitates a manipulation of a valve element at an awkward location on the underside of the vessel and in a region close to the area of maximum heat intensity where optimum damper adjustment is uncomfortable to achieve. This latter difficulty is multiplied by the number of ports and valve elements that are provided in a given unit.

Therefore, an important object of the present invention is to provide a damper-controlled barbecue vessel in which the damper is easily and comfortably adjusted.

A more general object of the present invention is to provide a new and improved barbecue vessel.

Another object of the present invention is to provide a damper-controlled barbecue vessel which is characterized by a highly uniform adjustment of the draft.

Still another object of the present invention is to provide a barbecue vessel that is safe to use.

Yet another object of the present invention is to provide a barbecue vessel that is characterized by easy ash removal.

These and other objects and features of the invention will become more apparent from a consideration of the following descriptions.

The invention, both as to its construction and its mode of operation, will be better understood by reference to the following disclosure and drawing forming a part thereof, wherein:

FIG. 1 is a perspective view of a barbecue vessel constructed in compliance with the principles of the present invention;

FIG. 2 is an enlarged, cross-sectional view taken substantially along the line 2—2 of FIG. 1;

FIG. 3 is a further enlarged, fragmentary, perspective view of the skirt and interfitting collar of the barbecue vessel of FIGS. 1 and 2;

FIG. 4 is a cross-sectional view taken substantially along the line 4—4 of FIG. 2; and FIG. 5 is an enlarged, fragmentary, perspective view showing a cover vent and cooperative valve element.

Referring now in detail to the drawing, specifically to FIG. 1, a barbecue vessel arrangement is indicated generally by the reference numeral 10 and comprises a lower, generally hemispherical vessel 12, an upper, inverted hemispherical vessel or cover 14, a tubular base shell 16 which telescopingly receives a skirt 18 that depends from vessel 12, and a carriage unit 20 upon which the other elements are supported.

Turning to a consideration of FIG. 2, the vessel members 12 and 14 are fabricated from a suitable material such as porcelain enameled steel, fabrication of the vessels to form in compliance with the present invention being desirably completed before the porcelain eanmel is applied. More specifically, the lower vessel member 12 is fashioned with a circular bottom opening 22; and the skirt 16 is made with an inturned annular flange 24 which may be aligned with the edges of the bottom opening 22 whereupon a series of suitably spaced spot welds 26 may be employed in attaching the depending skirt 18 to the vessel member 12 surrounding the bottom opening 22. Since the lower vessel member 12 is intened to define a fire pot, a suitable number of arcuately spaced brackets 28 are fixed to the inside wall of the vessel member 12; and each of the brackets 28 is fashioned with a lower horizontal shelf 30 and an upper horizontal shelf 32. The shelves 30 are aligned in a horizontal plane to receive and support a fire tray or grate 34. The grate 34 is advantageously employed in supporting a bed of charcoal 36 or other fuel over the bottom opening 22. Correspondingly, the upper shelves 32 support a broiling tray or grate 38 a suitable distance above the fire tray 34. In compliance with the present invention, as will appear more fully hereinafter, the lower vessel member 12 is provided with handles 40 that are welded or otherwise suitably mounted on the vessel member radially and axially remote from the skirt 18. Finally, the upper lip of the vessel member 12 is rolled to form a smooth bead 42.

The upper vessel member 14 is fashioned with an offset lip 44 which cooperatively receives the bead 42 in fitting the vessel members 12 and 14 together. In addition, an upright handle 46 is suitably mounted on the top of vessel 14 for facility in its manipulation; and in order to encourage draft through the space enclosed by the vessels 12 and 14, a suitable number of vent units 48 are provided at the top of vessel 14 adjacent the handle 46. With reference for the moment to FIG. 5, a vent unit 48 is seen to comprise a vent opening 50 perforated in the wall of vessel member 14 and a valve blade 52 that is swingably mounted to the material of vessel 14 by a rivet 54. Advantageously, an upstanding ear 56 is raised from the valve blade 52 for manipulating the valve blade 52 in selectively closing the vent opening 50.

Continuing now with reference to FIGS. 1 and 2, the carriage unit 20 is seen to comprise a suitable number of legs 58 which elevate the fire pot comprising vessel member 12 a suitable distance above a ground plane 60. In the illustrated embodiment, three tubular legs 58 are employed in tripod fashion, two of the legs carrying a shaft 62 that, in turn, bears wheels 64. The third leg 58 is held in position by means of a brace unit 66 and carries a foot 68 on its lower end in order to prevent undirected rolling of the barbecue vessel arrangement. Considering FIG. 2 with supplemental reference to FIG. 4, each of the legs 58 is seen to have a flattened and inturned flange 70 at its upper end, the flanges 70 being disposed beneath the base shell 16 to be secured thereto by rivets 72 or other suitable fastening means.

In compliance with the present invention, the base shell 16 includes a bottom element 74 and a tubular collar 76 that is connected to the bottom element 74 in upstanding relationship. The collar 76 is sized and shaped to interfit rotatably with the skirt 18; and more specifically, the collar 76 is sized and shaped to telescope slidably and rotatably with the skirt 18. Accordingly, interfitting regions of the collar 76 and the skirt 18 are provided with substantially smooth surfaces 78, indicated in FIG. 3, whereby to promote telescoping assembly and disassembly of these parts.

In further accord with the features of this invention, the skirt 18 is perforated with a number of arcuately spaced, lateral damper ports 80 whereas the collar 76 is perforated with cooperating, lateral ports 82. The ports 80 and 82 are selectively registrable to achieve a valving action as will become apparent more fully hereinafter. A portion of the flange that surrounds the opening 22 is exposed radially outwardly of the skirt 18; and when the collar 76 telescopingly receives the skirt 18, this flange serves as a stop and bearing for the upper edge or lip 84 of the collar 76. The datum established by contact of the edge 84 with this flange may be used to advantage in locating the relative axial positions of the ports 80 and 82 so as to permit substantially complete registration in one position of relative rotation. Such a complete registration establishes a maximum damper opening for the barbecue vessel arrangement. In the illustrated embodiment, the ports 80 and 82 are of the same size and shape, are of the same number and are spaced angularly to the same extent.

For purposes of affording a more complete understanding of the invention, it is advantageous now to describe the manner in which the illustrated embodiment of the invention is used. Assuming that a bed of charcoal or other fuel has been disposed on the fire tray 34 and ignited in preparation for a cooking operation, the cover or vessel member 14 will be placed over the fire pot or vessel member 12 to conserve the heat being evolved. Control of the rate of fuel burning is readily achieved, with the valve blades 52 exposing the vent openings 50, by grasping one or both of the handles 40 and turning the lower vessel member 12 relative to the carriage unit 20 and the base shell 16 until an appropriate degree of registration of ports 80 and 82 is produced. When a more vigorous burning is desired, the ports 80 will be rotated into more complete registration with ports 82 and vice versa. In FIG. 4, a substantially complete registration of the ports 80 and 82 is illustrated for near maximum draft through the vessel arrangement.

It is to be recognized that the illustrated placement of the ports 80 and 82 achieves draft surrounding a vertical projection of the fuel bed supported on fire tray 34. Furthermore, any adjustment in draft is achieved uniformly about this circle of projection. It is also to be recognized that the relative axial positioning of the handles 40 relative to the skirt 18 establishes cool gripping sites remote from the intense heat in the vicinity of the skirt and fire tray. Furthermore, the relative radial positioning of the handles 40 establishes a comparatively long, lever arm, with its resultantly desirable mechanical advantage so that little force is needed to achieve any given rotation of the vessel member 12 and corresponding regulation in the registration of ports 80 and 82.

By fashioning the bottom opening 22 to be of generous size and by positioning it beneath the fire tray 34, ashes and other debris readily drop through the skirt 18 and into the base shell 16. Housing the ashes in the telescoping skirt and base shell renders glowing fragments comparatively inaccessible to the hands of youngsters; and accordingly reduces a potential hazard. Moreover, enclosing the ashes and glowing fragments in this manner precludes wind blown coals from presenting a fire danger. The smooth surfaces 78 of the skirt and the base shell permit easy telescoping disassembly for removal of ashes from the base shell.

While a particular embodiment of the invention has been shown and described, it should be clearly understood that the invention is not limited thereto since many modifications may be made. It is therefore contemplated to cover by the present application all such modifications that fall within the true spirit and scope of the appended claims.

The invention is claimed as follows:

1. A barbecue vessel comprising: a vessel member having a bottom opening; a depending skirt attached to said vessel surrounding said opening, said skirt having a plurality of first damper ports; a base shell having a bottom element and a collar upstanding from said body element, said collar rotatably interfitting with said skirt and said base shell having a plurality of second damper ports selectively registrable with said first damper ports; and handle means on said vessel member radially remote from said skirt whereby to facilitate adjustment in the relative registration of said first and second damper ports.

2. A barbecue vessel according to claim 1 which further comprises fire tray support means mounted in said vessel member adjacent said bottom opening and a fire tray on said fire tray support means; and wherein said handle means are additionally disposed axially remote from said fire tray support means.

3. A barbecue vessel according to claim 1 wherein said second damper ports are provided in the same number and at the same spacing as said first damper ports.

4. A barbecue vessel according to claim 1 wherein interfitting regions of said skirt and collar include substantially smooth surfaces, whereby to permit telescoping assembly and disassembly for removal of ashes from said base shell.

References Cited
UNITED STATES PATENTS

| | | | |
|---|---|---|---|
| 2,641,243 | 6/1953 | Guss | 126—25 |
| 3,025,848 | 3/1962 | Malgesini | 126—25 |
| 3,051,159 | 8/1962 | Hardy | 126—25 |
| 3,285,239 | 11/1966 | Drake | 126—25 |

FREDERICK L. MATTESON, Jr., *Primary Examiner.*

E. G. FAVORS, *Assistant Examiner.*